United States Patent [19]

Iovino

[11] 4,348,700
[45] Sep. 7, 1982

[54] ERASE ATTACHMENT FOR TAPE CASSETTES

[76] Inventor: Jerry Iovino, 2 Geraldine Rd., North Arlington, N.J. 07032

[21] Appl. No.: 142,777

[22] Filed: Apr. 22, 1980

Related U.S. Application Data

[63] Continuation-in-part of Ser. No. 970,118, Dec. 18, 1978.

[51] Int. Cl.³ .............................................. G11B 15/04
[52] U.S. Cl. ...................................................... 360/60
[58] Field of Search .................... 360/60, 93, 137, 132

[56] References Cited

U.S. PATENT DOCUMENTS

| | | | |
|---|---|---|---|
| 3,828,363 | 8/1974 | Somers | 360/60 |
| 3,848,265 | 11/1974 | Biery et al. | 360/60 |
| 4,044,386 | 8/1977 | Satou | 360/60 |
| 4,057,839 | 11/1977 | Banks | 360/93 |

*Primary Examiner*—Vincent P. Canney
*Attorney, Agent, or Firm*—Jacobi, Siegel, Presta, Marzullo & Aronson

[57] ABSTRACT

A flexible, elongated, easily insertable and extractable cassette recording/erasing device with inwardly extending end portions that are receivable within the erase openings of the cassette so that the device can perform the functions of the record and erase tabs on the rear edges of standard commercial cassettes. Between the end portions, the device may be provided with a laterally outwardly extending section on each side thereof from which walls extend in spaced, generally parallel relation in the same direction as the end portions. The walls engage opposite sides of the cassette to removably retain the device on the cassette when the end portions are positioned in the erase openings of the cassette.

10 Claims, 8 Drawing Figures

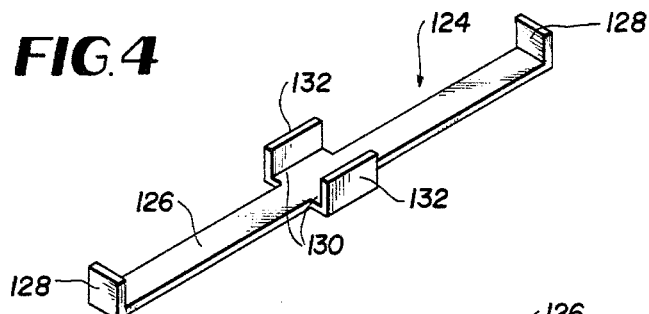
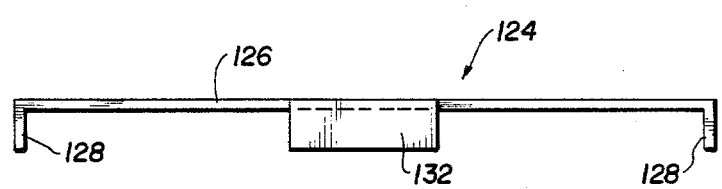
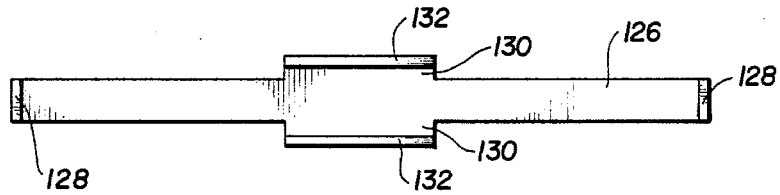
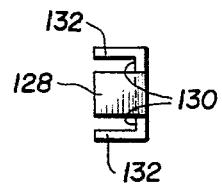
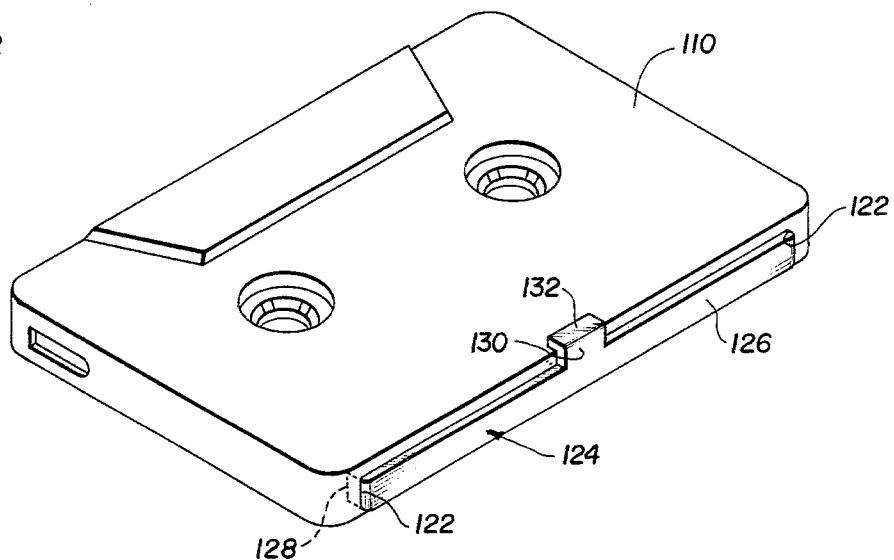

ERASE ATTACHMENT FOR TAPE CASSETTES

CROSS-REFERENCE TO RELATED APPLICATION

This application is a continuation-in-part of application Ser. No. 970,118, filed on Dec. 18, 1978.

BACKGROUND OF THE INVENTION

The use of tape cassettes has virtually supplanted open reel recording and is rapidly replacing 8 track tapes for the home market, owing to advances in reproduction quality, convenience of use, storage, etc. Home equipment tape cassette players which both play and record are equipped with a probe that is adapted to engage the rear edge of the cassette. In many cases, breakout tabs are provided on the rear edge of the tape cassette and may be removed when the cassette tape contains material that is to be preserved. With the tabs removed, either intentionally or inadvertently, the probe on the recorder penetrates through the plane of the rear edge of the cassette and an interlock prevents the erase and record functions of the recorder. This feature prevents accidental erasing of material from the tape, but also prevents intentional erasure and reuse of the tape. In many instances, such as tape recorded letters, it is desirable to prevent accidental erasure of the tape and also to reuse the tape for subsequent correspondence.

Various means have been proposed with respect to the problem of permitting or preventing erasure of cassette tapes. Among them are specially made cassettes with sliding covers and/or inserts to be fitted into the openings after intentional or accidental removal of the tabs. These specially made cassettes naturally are of no use to those who have an ample supply of cassettes of other types and, additionally, individuals are prone to forget to set a sliding tab in the desired erase preventive position after recording. The inserts are small and easy to lose, difficult to insert and remove, and are also subject to inadvertently leaving them in place after recording. In addition, cassettes with sliding covers or inserts are difficult and expensive to manufacture.

Accordingly, a need has arisen for a simple, inexpensive and reliable means for permitting erasure and re-recording of a cassette tape in cases where the tabs have been removed from the rear edge of the cassette.

SUMMARY OF THE INVENTION

The erasing and recording attachment of the present invention comprises an elongated body portion having inwardly extending end portions adapted to be removably received within the erase openings of a cassette. The attachment is easily insertable and removable and does not require the manipulation of small parts. Its size and distinctive shape allow it to be easily located and stored or mailed along with the cassette for use by the receiving party, e.g., in the case of letters or the like on tape. When the cassette is removed from the recorder, the attachment provides both a tactual and visual reminder to the user that it is mounted on the cassette so as to effectively prevent inadvertently leaving it in place and subsequent accidental erasure of the tape.

Between the end portions, the body portion is provided with laterally outwardly extending sections disposed on both sides thereof, in accordance with one embodiment of the invention. The outer end of each section merges with a wall or flange extending in the same direction as the end portions. The walls are disposed in generally parallel relation and are adapted to engage opposite sides of a cassette to removably retain the attachment on the cassette when the end portions are positioned in the erase openings of the cassette.

BRIEF DESCRIPTION OF THE DRAWINGS

FIG. 4 is a perspective view of a second embodiment of the erase and record attachment of the present invention;

FIG. 5 is a side elevational view of the attachment shown in FIG. 4;

FIG. 6 is a bottom plan view of the attachment shown in FIG. 4;

FIG. 7 is an end elevational view of the attachment shown in FIG. 4; and

FIG. 8 is a perspective view showing the attachment of FIG. 4 mounted on a tape cassette.

DESCRIPTION OF THE PREFERRED EMBODIMENTS

Figure 2:
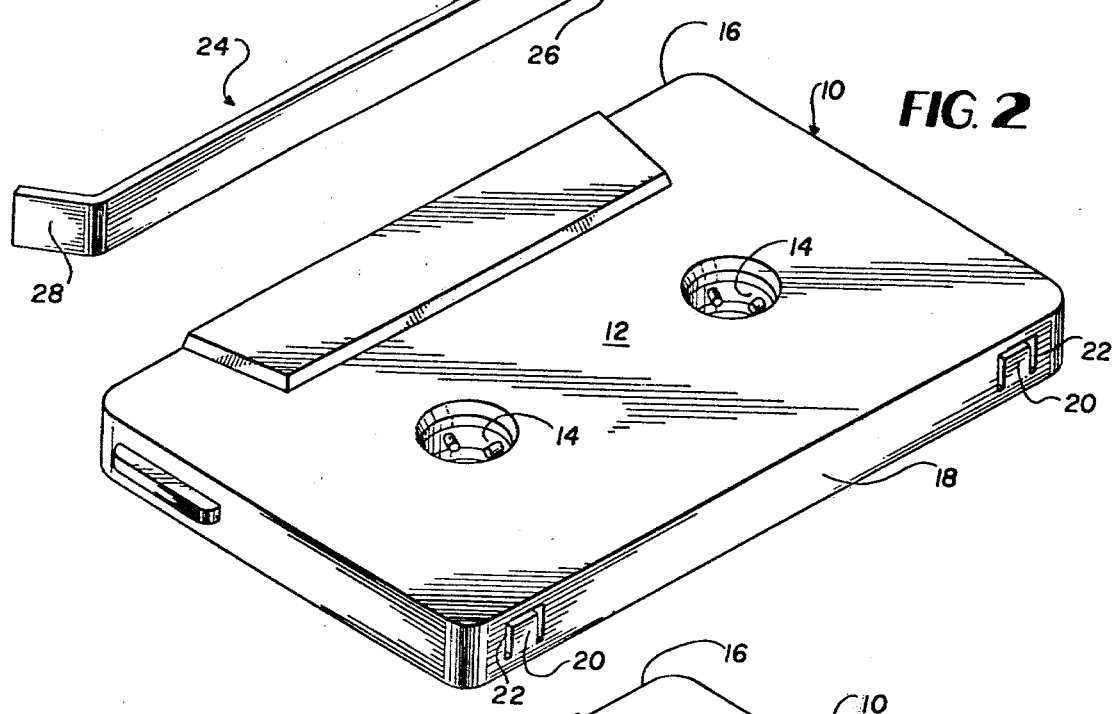
FIG. 2 is a rear perspective view of a typical tape cassette.

Referring to FIG. 2, a typical tape cassette 10 comprises a case 12, usually molded from plastic, a pair of spools 14 for holding the tape, and various internal guides (not shown) for guiding and transporting the tape. The front edge 16 of the cassette 10 contains openings (not shown) exposing the tape to the various record, erase and playback heads of a cassette recorder (not shown).

The rear edge 18 of the cassette 10 includes tabs 20 positioned in recesses 22 therein. The tabs 20 are normally molded as part of the case 12 and are positioned so as to interact with a probe (not shown) in the cassette recorder to enable erasing or recording of the tape. It is usual to provide two spaced tabs 20, each controlling the erase/record function of one track of the tape.

When the tabs 20 are broken out and discarded, either intentionally or inadvertently, the probe in the tape recorder enters one of the recesses or erase openings 22 and prevents erase or record functions of the recorder from taking place on the track of the tape that is controlled by that recess.

Figure 1:
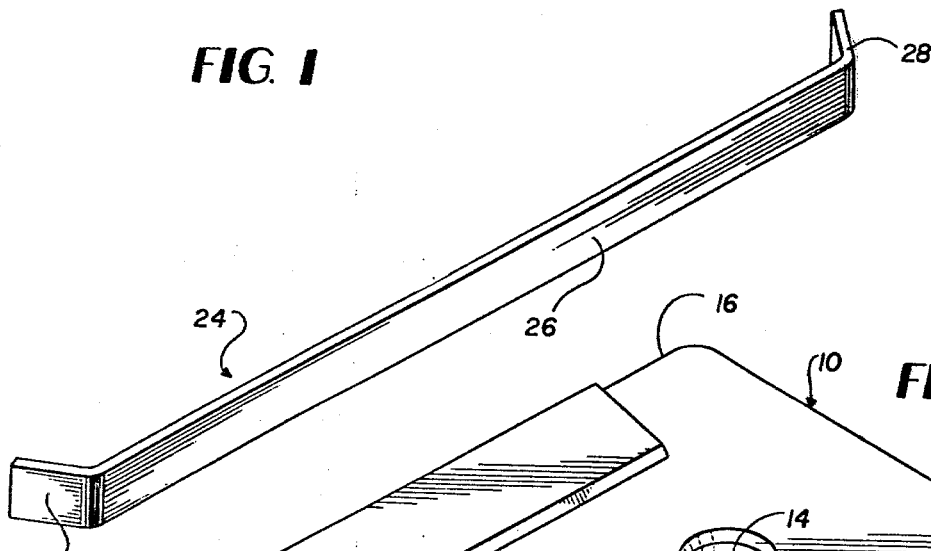
FIG. 1 is a perspective view of a first embodiment of the erase and record attachment of the present invention.
Figure 3:
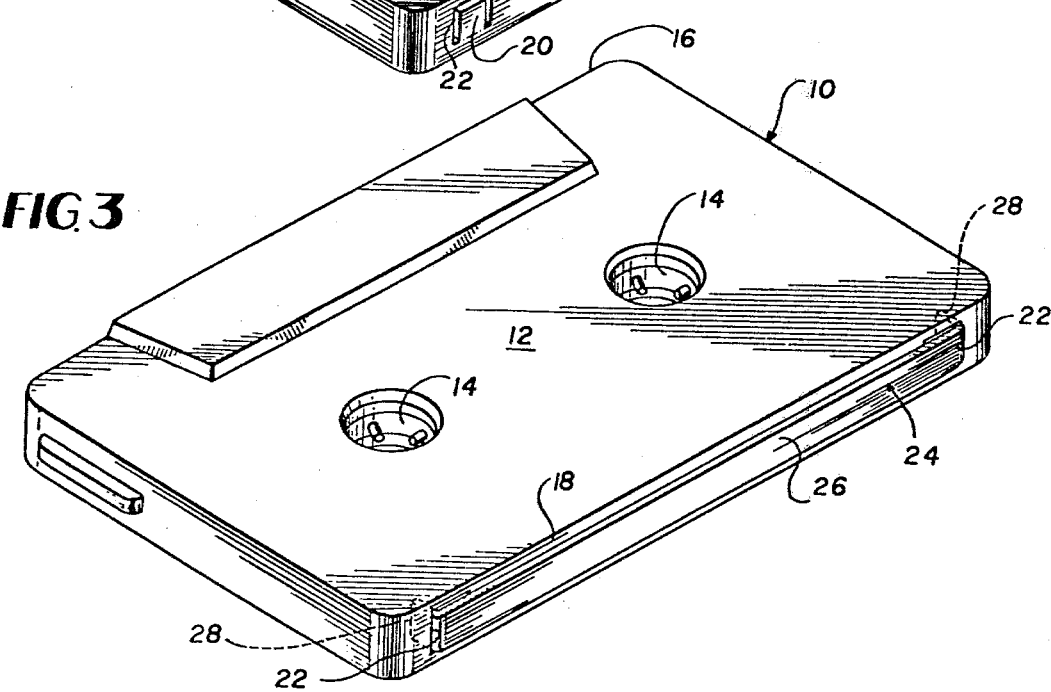
FIG. 3 is a perspective view similar to FIG. 2, showing the erase and record attachment of FIG. 1 mounted on the tape cassette.

As shown in FIGS. 1 and 3, the erase/record enabling attachment 24 of the present invention has an elongated body portion 26 that is preferably of the same width or slightly narrower than the width of the recesses or erase openings 22 that are exposed when the tabs 20 are removed. The body portion 26 preferably is slightly shorter than the distance between the farthest edges of the spaced recesses 22. The attachment 24 is provided with inwardly or laterally extending end portions 28 that are adapted to be received within the recesses or erase openings 22 of the cassette 10.

In FIG. 3, the attachment 24 is shown mounted on the cassette 10 with the end portions 28 extending into the recesses 22 in the rear edge 18 of the cassette case 12. The cassette may now be inserted into a cassette recorder such that the probe in the recorder will contact the attachment 24 where it covers the recesses 22 to enable the recorder to erase or record on the tape as may be desired. When the cassette 10 is removed from the cassette recorder, attachment 10 is easily seen and provides a tactual indication to anyone holding the cassette 10 that the attachment 24 is mounted thereon. The attachment 24 may be of a contrasting color to the cassette 10 to provide an additional visual reminder that it is in place.

Because of its size and configuration, the attachment 24 may be easily inserted in and removed from a cassette, and does not inhibit insertion or extraction of the cassette from a cassette recorder.

The attachment 24 may be formed of any suitable material and may be of any desired specific configuration that conforms to the general configuration shown in FIGS. 1 and 3. Preferably, the attachment 24 is formed of a flexible and resilient plastic material so that it can be easily and cheaply molded. Also, it is preferable that the end portions 28 be normally disposed at an obtuse angle to the body portion 26, as shown in FIG. 1, so that the end portions are deformable inwardly as they are inserted within the erase openings. After insertion within the erase openings, the end portions 28 will move outwardly to facilitate the retention of the attachment 24 on the cassette 10.

A modified form of an erase and record attachment 124 is shown in FIGS. 4-8. In this second embodiment of applicant's invention, the attachment 124 comprises an elongated body portion 126 with inwardly or laterally extending end portions 128 that are adapted to be received within the recesses or erase openings 122 of a cassette 110 in the manner shown in FIG. 8.

Intermediate the end portions 128, the body portion 126 is provided with laterally outwardly extending sections 130 disposed on both sides thereof. The outer end of each section 130 is connected to a wall or flange 132 extending inwardly in the same direction as the end portions 128. The walls 132 are disposed in generally parallel relation and are adapted to engage opposite sides of the cassette 110 to removably retain the attachment 124 thereon with the end portions 128 positioned in the erase openings 122 of the cassette, as shown in FIG. 8. The spacing of the walls 132 preferably is slightly less than the thickness of the cassette to provide for a friction fit of the walls thereon.

Preferably, the attachment 124 is formed of a flexible and resilient plastic material so that it can be easily and cheaply molded in one piece. Unlike the attachment 24 shown in FIGS. 1-3, the end portions 128 preferably are disposed in substantially perpendicular relation to the body portion 126 rather than being disposed at an oblique angle thereto. This is because of the provision of the walls 132 which serve to removably retain the attachment 124 on the cassette.

What is claimed is:

1. An erasing attachment for a conventional tape cassette having spaced erase openings in a portion thereof, said attachment comprising:
    an elongated body portion of a length sufficient to extend longitudinally along the exterior of the cassette portion from one erase opening to another, and
    end portions extending laterally from the ends of said body portion and being removably receivable within the erase openings to position the attachment on the cassette so that said body portion covers the erase openings.

2. The erasing attachment of claim 1 wherein said body portion and said end portions are of a unitary construction and are formed of a flexible and resilient material.

3. The erasing attachment of claim 2 wherein said body portion and said end portions are formed of a plastic material.

4. The erasing attachment of claim 2 wherein said end portions are each normally disposed at an obtuse angle to said body portion and are deformable inwardly when they are inserted within the erase openings.

5. The erasing attachment of claim 1 wherein said end portions are of a width that is substantially the same as that of the erase openings.

6. The erasing attachment of claim 1 wherein said end portions are of a width that is slightly less than that of the erase openings.

7. The erasing attachment of claim 2 wherein said body portion and said end portions are in the form of a substantially flat strip.

8. The erasing attachment of claim 1 wherein said body portion is provided with a pair of walls extending therefrom in substantially parallel relation in the same direction as said end portions, said walls being adapted to engage opposite sides of the cassette to removably retain the attachment on the cassette when said end portions are positioned in the erase openings.

9. The erasing attachment of claim 8 wherein said walls extend from opposite sides of the mid-section of said body portion and are spaced apart a distance less than the thickness of the cassette.

10. The erasing attachment of claim 9 wherein said body portion is provided with laterally outwardly extending sections disposed on opposite sides thereof, and said walls are connected to said sections.

* * * * *